July 17, 1951  R. S. REAVES  2,560,702
TRACTOR MOUNTED CULTIVATOR
Filed June 14, 1948  2 Sheets-Sheet 1

Inventor
Robert S. Reaves
By Kimball A. Wyman
Attorney

July 17, 1951  R. S. REAVES  2,560,702
TRACTOR MOUNTED CULTIVATOR
Filed June 14, 1948  2 Sheets-Sheet 2
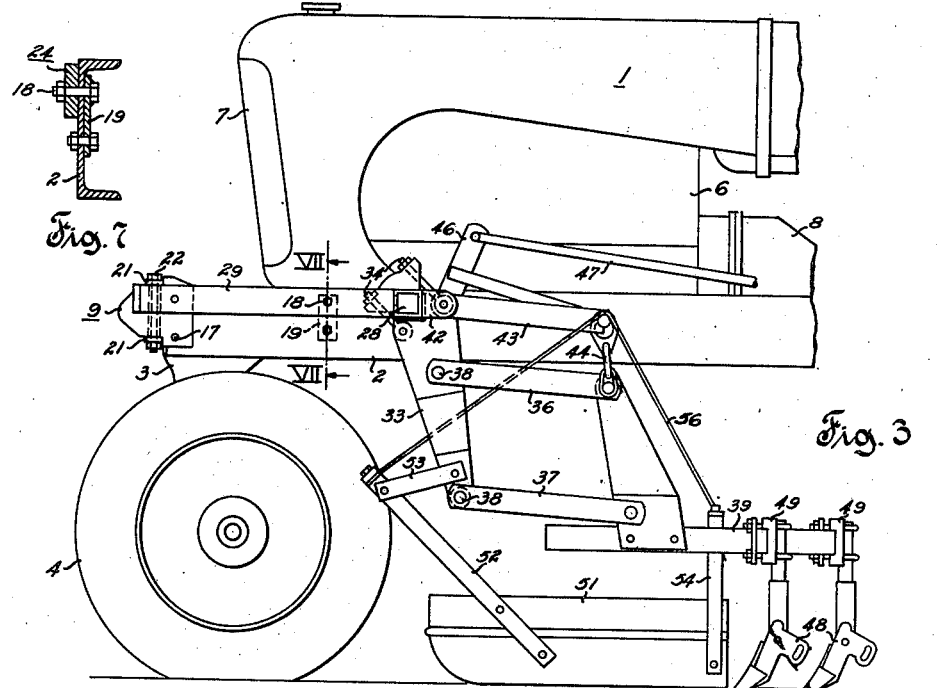
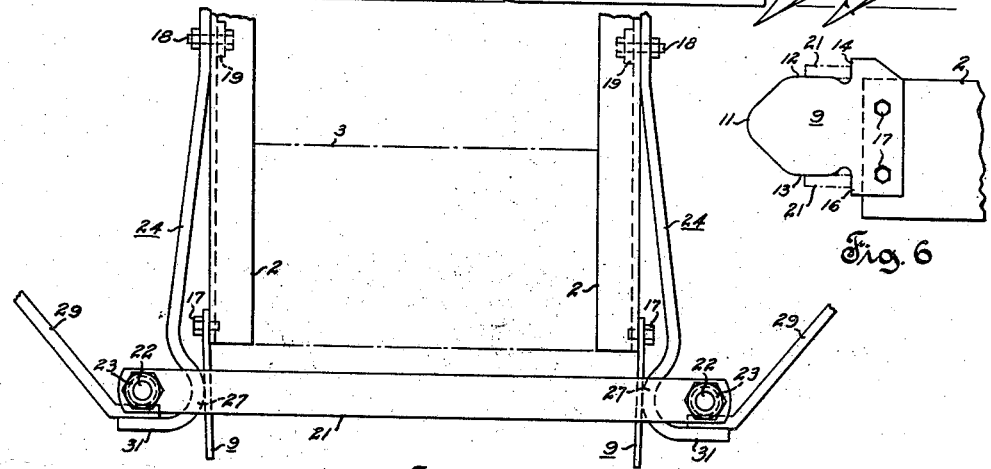
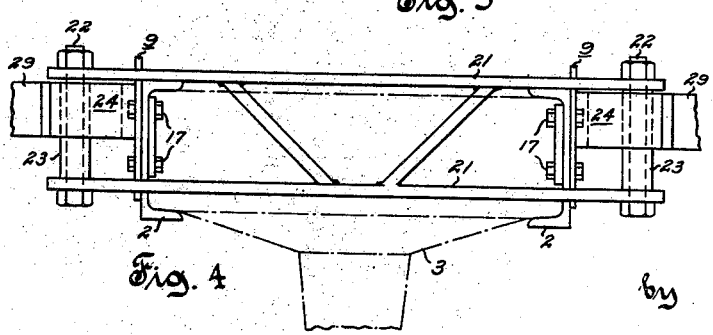
Inventor
Robert S. Reaves
by Kimball S. Wyman
Attorney Patented July 17, 1951

2,560,702

UNITED STATES PATENT OFFICE 2,560,702

TRACTOR MOUNTED CULTIVATOR

Robert S. Reaves, La Crosse, Wis., assignor to Allis-Chalmers Manufacturing Company, Milwaukee, Wis., a corporation of Delaware Application June 14, 1948, Serial No. 32,810

13 Claims. (Cl. 97—47)

This invention relates generally to agricultural implements attachable to or mounted on a draft vehicle, hereinafter called tractor, and more particularly to a drive-in type implement incorporating features of material advantage in supportedly attaching the implement to a tractor.

Accordingly the present invention is directed toward and has as an object the provision of a drive-in type tractor-implement combination incorporating improved features of construction affording a quick detachable stabilized mounting with a minimum number of parts.

Another object of the present invention is to provide a drive-in type implement attachment including parts constructed and combined for coaction with each other and with the front and adjacent side portions of a tractor in an improved manner affording a simplified pivot pin and brace construction and/or eliminating the provision of separate means for retaining the front end of the implement in position on the front end of the tractor.

Still another object of this invention is to provide an improved drive-in type tractor implement combination wherein tractor and implement parts are constructed and combinable for coaction in a manner affording a stabilized mounting of the implement simply by detachably securing a pair of laterally swingable side members to opposite forward side portions of the tractor frame.

A further object of the present invention is to provide a drive-in type implement attachment incorporating parts constructed and combined for coaction with each other and with the forward portion of a tractor in an improved manner, all to the end of affording a simplified, sturdy low cost construction which can be readily attached to or detached from a tractor with a minimum of time, effort and skill.

The construction and operation of apparatus embodying the invention will become readily apparent as the disclosure progresses and particularly points out additional objects and advantages deemed of special importance. An accordingly the present invention may be considered as comprising the various features of construction and combination hereinafter more fully set forth in the detailed description and appended claims, reference being had to the accompanying drawings illustrating but a single embodiment of the invention, and in which:

Fig. 3 is a partial side view of the tractor implement combination shown in Fig. 2;

Fig. 4 is a partial view in elevation of the front end of the tractor shown in Fig. 3;

Fig. 5 is a partial plan view of the structure shown in Fig. 3 illustrating the lateral deflection imparted to the tractor-mounted forwardly extending supports by the forward cam-shaped portions of the side members;

Fig. 6 is an enlarged view in side elevation of the one of the pair of tractor-mounted forwardly extending supports; and Fig. 7 is a view taken on line VII—VII of Fig. 3.

Figures 1, 2:
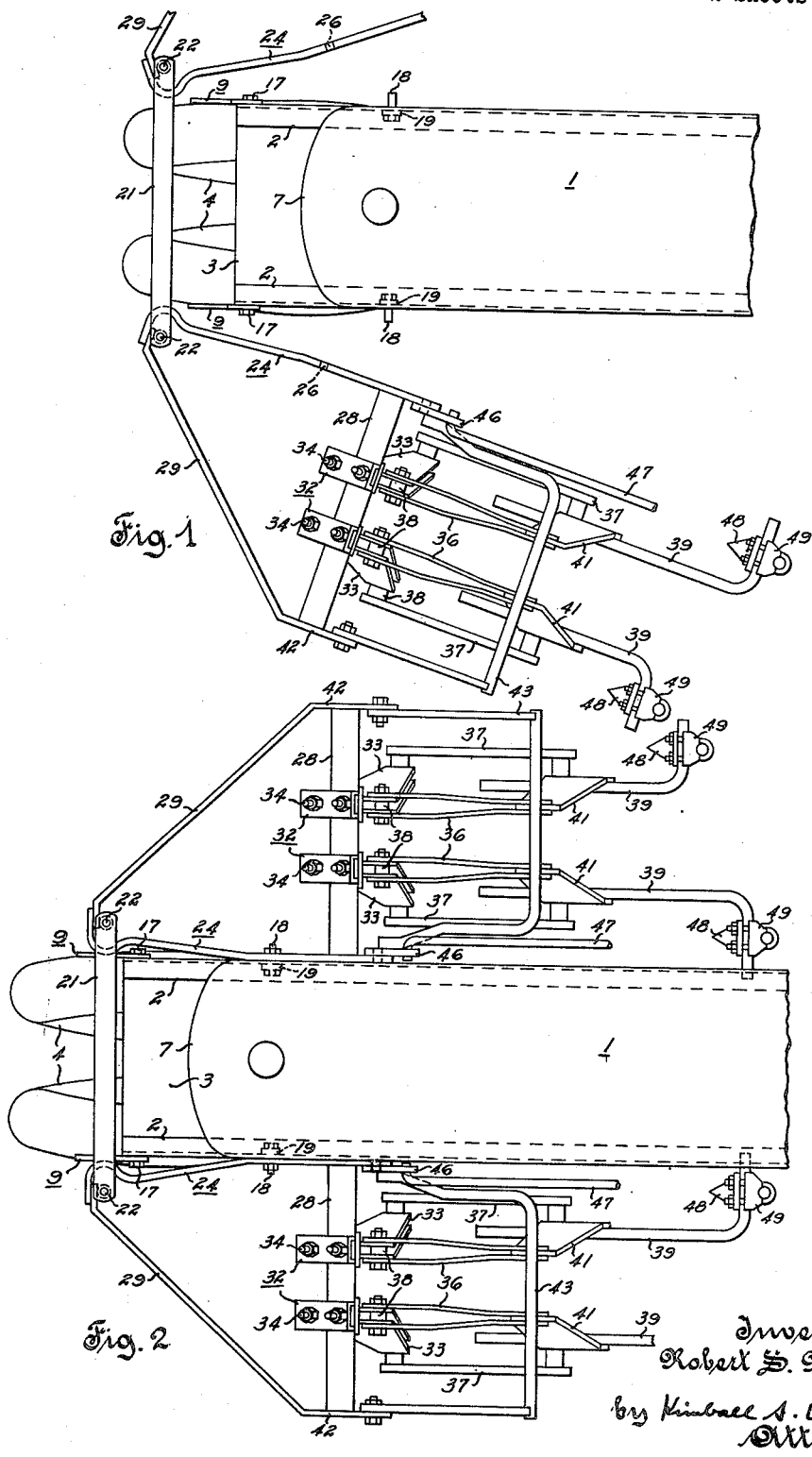
Fig. 1 is a partial plan view illustrating the relation of the implement to the forward portion of a tractor which is being driven into the implement preparatory to attaching same, the plant guards and parts supporting same being omitted for the sake of clarity.
Fig. 2 is a plan view showing the implement attached to the forward portion of the tractor.

Referring to Figs. 2 and 3, it will be seen that the drive-in type implement is attached to the forward end of a conventional tricycle type tractor 1 of which only the forward portion is shown in the interest of simplicity. As shown, the forward portion of the tractor comprises a pair of generally parallel side frame members 2 and a rigid central pedestal structure 3 rigidly uniting forward end portions of side frames 2 and including a depending conventional dirigible wheel mounting supported on a pair of closely spaced front wheels 4. The frame structure mounts an engine 6 enclosed in a combined hood and radiator structure 7, the engine delivering power to the rear traction means (not shown) through the usual clutch and gear means enclosed in rearwardly extending housing 8.

Referring also to Figs. 1 and 6, it will be noted that a pair of similar brackets 9 are secured to the front of the tractor and project forwardly from opposite side portions thereof in generally parallel relation with respect to each other. Brackets present rounded nose portions 11 and laterally aligned top and bottom edge surfaces 12 and 13 terminating in vertically extending aligned shoulder portions 14 and 16, respectively. These brackets are preferably detachably secured to the forward outer side portions of frame members in any suitable manner such as by cap screws or bolts 17. Opposed laterally aligned portions of side frame members, that is, portions to the rear of the front ends thereof are each provided (note Fig. 7) with a hole through which extends a bolt 18, the latter being welded to a piece of strap metal 19 which in turn is bolted in side abutting relation to the inner surface of the frame member with the bolt projecting through the hole thereinas above indicated.

The implement proper comprises a rigid transverse front structure formed by a pair of bar elements 21 having opposite end portions thereof fixedly united by means of bolts 22 and spacers 23 positioning the bar elements in spaced parallel relation with respect to each other, the spacing of these elements conforming with the vertical spacing of the top and bottom edge surfaces 12 and 13, respectively, of brackets 9. The spacing elements surrounding the bolts in effect afford pivot supports for the forward ends of a pair of similar side members 24, these members extending rearward and having rear end portions thereof provided with holes 26 alignable with and adaptable to receive the bolts 18 projecting generally outward from tractor side frame members 2. Consequently, it should now be apparent that side frame members 24 are supported on outer opposite end portions of the rigid transverse front structure (bar elements 21 and the bolt and spacer means 22 and 23) for swinging movement about generally parallel vertical axes afforded by the bolt and spacer connections. In addition, it should be noted that the forward end portions of side members 24, that is, portions adjacent the opposite ends of the rigid front structure, are offset inwardly as indicated at 27 to provide cam-like surfaces.

A laterally outwardly extending rigid draft bar 28 has its inner end fixedly secured to each of the side members. And a rigid brace 29 connects the outer end portion of each draft bar with the forward portion of the adjacent side member for swinging movement therewith. In the construction shown (note Fig. 5) the forward ends of these brace elements are secured to the spacer element (as by welds) and the forward ends of the side members 24 have out-turned portions 31 side abutting the forward end of the brace elements and are welded or otherwise fixedly secured thereto.

However, this is a mere detail of construction and whether the forward ends of the side members are secured directly to the spacer elements or to the brace means which are in turn secured to the spacer elements as shown is of no particular importance insofar as the present invention is concerned. A plurality of tool rigs 32 are detachably clamped to the draft bar in laterally spaced relation and for relative adjustment longitudinally thereof. Each rig comprises a rigidly disposed fabricated front link 33 (this link being clamped to the bars above mentioned by bolts or the like 34 in a conventional manner) a pair of vertically spaced rearwardly extending links 36 and 37 having forward portions thereof supported on vertically spaced pivot mountings 38 carried by front link 33 and affording vertical swinging movement of links about parallel transverse pivot axes and a tool frame 39 having an upstanding rigid part 41 pivotally connected with rear end portions of links 36 and 37. The rear portion 42 of brace element 29 extends rearwardly beyond draft bar 28 in generally parallel side opposed relation to the rear portion of side member 24 and these opposed portions pivotally support a lift bail structure 43 disposed in overlying relation to the upper links of the previously described rig structures. The rear end of the bail element is connected with the underlying parallel linkage of the rig structure through a flexible means such as a chain 44 and this bail is provided with an upstanding actuating arm 46 to which is attached a link 47 extending rearward alongside the tractor to means for actuating same (not shown) so as to afford vertical swinging movement of the bail element for raising and lowering the rigs as desired. As shown, each rigid tool frame mounts one or more depending ground working tools 48 which are detachably secured to the frame for adjustment therealong through conventional clamping structures 49. The tool frames also mount plant shields or guards (note Fig. 3) comprising vertically disposed plate like elements 51 having a forward portion thereof secured to the lower portion of the vertical front link 33 of the rig structure by means of a strap part 52 having a lower portion fixedly secured to the outer surface of the shield and having its upper end pivotally connected with the forward end of a link 53 which has its rear end pivotally secured to the lower portion of rig link 33. The rear portions of these plant guards are united by an upwardly arched brace structure 54 and the position of the shields relative to the ground is controlled by a flexible chain or cable 56 having its rear end connected to brace structure 54 and extending over the lift bail 43 with its forward end connected to the upwardly projecting strap 52. And in this connection, it should be noted (particular reference being had to Fig. 1) that the rigs and the tools carried thereby are so related to the front structure and side members that when the side members are disposed in diverging tractor receiving relation, the rigs and tools support and position the front structure and side members, collapse of the parallel linkages being prevented in any suitable manner, at an elevation conforming with the elevation of brackets 9 and securing bolts 18.

The front structure has a length in excess of the width of the forward end of the tractor, that is, the bolt and spacer connections uniting opposite end portions of bar elements 21 are spaced apart a distance greater than the lateral spacing of brackets 9 so that when the implement is supported on the ground as indicated in Fig. 1 the tractor may be driven forward thus inserting the nose portions of the brackets between bar elements 21 and until the bar elements are supported on the laterally aligned top and bottom edge surfaces of the brackets with the rear sides of the elements abutting the vertically extending shoulder portions 14 and 16. This movement of the tractor and engagement of the brackets 9 with the front structure as above described has a tendency to swing the side members 24 inwardly toward opposite forward side portions of tractor frame members. And all that has to be done in order to complete attachment of the implement to the tractor is to swing the side members 24 until the rear portions thereof side abut tractor frame members with the holes 26 in the former aligned with and receiving the outwardly projecting bolts 18 fixedly attached to frame members 2 and to place a nut on these bolts and tighten same. The implement is now fixedly secured to the tractor since the brackets 9 prevent a vertical movement of the implement relative thereto. In this connection it should be particularly noted (note Figs. 4 and 5) that the brackets are vertically rigid and somewhat laterally flexible and that the inward swinging movement of the side members to bring rear end portions thereof into side abutting engagement with tractor frame members causes the inwardly offset cam portions 27 of the side members 24 to first engage the outer side portions of brackets 9 whereupon continued movement of the side members results in an inward flexing of the brackets sufficient to afford a firm clamping action which in connection with the bar elements engaging top and bottom edge surfaces of the brackets afford an extremely stabilized mounting for the implement. The brackets may if desired be permanently attached to the forward end of the tractor as that would in no manner interfere with uses to which the tractor may be put and when thus secured it should be obvious that all that has to be done in order to attach the implement to the tractor is to position the latter as shown in Fig. 1 whereupon the tractor may be driven into the implement and the side members of the implement secured to the tractor simply by two bolt connections. Obviously the implement can be detached from the tractor simply by disconnecting lift mechanism link 47 (assuming this link had been connected as shown in attaching the implement to the tractor) and by removing the nuts from bolts whereupon side frame members can be swung outward relative to the tractor and the tractor detached from the implement by backing it away from the front structure thereof and in this connection it is to be understood, as above stated, that any suitable means may be employed, as desired, for preventing collapse of the parallel rig linkages upon detachment of the implement from the tractor.

It should be apparent that although the disclosed apparatus affords all of the advantages inherently present in a cultivator constructed for accomplishing the previously stated objects, certain features of the present invention are obviously applicable to other types of tractor mounted implements. And it should, therefore, be understood that it is not intended to limit the present invention to the exact constructions and combinations herein shown and described for purposes of illustration as various modifications within the scope of the appended claims may occur to persons skilled in the art.

It is claimed and desired to secure by Letters Patent:

1. A drive-in type implement attachment for tractors comprising a front structure adapted for engagement with the front end of a tractor, a pair of elongated side members having their forward ends supported on said front structure for swinging movement relative thereto about generally parallel vertical axes, said side members having opposed forward portions offset toward each other for cam-like clamping engagement with tractor parts disposed therebetween as said side members are swung toward each other to bring rear portions of said side members into engagement with opposite forward side portions of a tractor, and means for detachably securing said rear portions of said side members to opposite side portions of a tractor.

2. A drive-in type implement attachment for tractors comprising a rigid transverse front structure engageable with the front end of the tractor to which the implement is to be attached, a pair of elongated side members having their forward ends pivotally supported on opposite end portions of said front structure for swinging movement relative thereto about generally parallel vertical axes, said side members having forward portions thereof offset inwardly for cam-like clamping engagement with parts on the tractor disposed therebetween as said side members are swung toward each other so as to bring rear end portions of the side members into engagement with opposite forward side portions of the tractor, means for detachably securing rear portions of said side members to opposite side portions of a tractor.

3. A drive-in type implement attachment for tractors comprising a rigid transverse front structure having a length in excess of the front end of the tractor to which the implement is to be attached, and a pair of elongated side members having their forward ends pivotally supported on opposite end portions of said front structure for swinging movement relative thereto about generally parallel vertical axes, said side members having forward portions thereof offset inwardly relative to the ends of said front structure for cam-like clamping engagement with parts on the tractor disposed therebetween as said side members are swung toward each other so as to bring rear end portions of the side members into engagement with opposite forward side portions of the tractor, means for detachably securing rear portions of said side members to opposite side portions of a tractor, a laterally outwardly extending draft bar rigidly fixed at its inner end to each of said side members, and a brace means connecting an outer end portion of each draft bar with a forward portion of the adjacent side member.

4. In combination with a tractor having a front end and opposite side portions extending rearward therefrom, an implement attachment comprising a front structure supportedly engaged with the front end of said tractor, a pair of elongated side members pivotally supported on said front structure for swinging movement relative thereto about generally parallel vertical axes, said side members having forward portions thereof offset inwardly for effecting cam-like clamping engagement with opposite front end side portions of the tractor as said side members are swung toward the tractor so as to bring rear end portions thereof into engagement with opposite sides of the tractor remote from said front structure, and means for fixedly detachably securing said rear end portions of said side members to said tractor.

5. In combination with a tractor having generally parallel opposite forward side portions and having a pair of similar brackets projecting forwardly from the front end of the tractor adjacent opposite sides thereof in generally parallel relation with respect to each other, an implement attachment comprising a transverse front structure having opposite end portions thereof supportedly engaged with the front end of said tractor, a pair of elongated side members pivotally supported on opposite end portions of said front structure for swinging movement relative thereto about generally parallel vertical axes, said side members having forward portions thereof offset inwardly for effecting cam-like engagement with the outer sides of said brackets as said members are swung inward toward the tractor so as to bring rear end portions of said members into side abutting engagement with opposite sides of said tractor remote from said front structure, and quick detachable connections fixedly securing rear end portions of said side members to said frame portions.

6. In combination with a tractor having generally parallel opposite forward side frame portions and having a pair of similar brackets projecting forwardly from the front end of the tractor adjacent opposite sides thereof in laterally aligned generally parallel relation with respect to each other, an implement attachment comprising a rigid transverse structure carried by the front end of said tractor and having opposite end portions thereof projecting equal distances laterally beyond the outer sides of said brackets, a pair of elongated side members pivotally supported on opposite end portions of said front structure for swinging movement relative thereto about generally parallel vertical axes, said side members having forward portions thereof offset inwardly for effecting cam-like engagement with the outer sides of said brackets as said members are swung inward toward the tractor so as to bring rear end portions of said members into side abutting engagement with the forward side frame portions of said tractor, and quick detachable connections fixedly securing rear end portions of said side members to said frame portions.

7. A tractor-implement combination comprising a tractor having generally parallel opposite forward side frame portions, a bracket structure projecting forwardly from the tractor adjacent opposite sides thereof, a rigid implement transverse front structure having opposite end portions thereof supportingly engaged with said bracket structure and projecting laterally beyond the outer sides thereof, a pair of elongated side members pivotally supported on opposite outer end portions of said front structure for swinging movement relative thereto about generally parallel vertical axes, said side members having forward portions thereof offset inwardly for engaging the outer sides of said brackets and flexing same inward as said members are swung toward same and so as to bring rear end portions of said members into side abutting engagement with the forward side frame portions of said tractor, and means for fixedly detachably securing rear end portions of said side members to said frame portions.

8. A tractor-implement combination comprising a tractor having generally parallel opposite forward side frame portions, a pair of similar vertically rigid and laterally flexible brackets projecting forwardly from the front end of the tractor adjacent opposite sides thereof in generally parallel relation with respect to each other, a rigid implement transverse front structure having opposite end portions thereof supportingly engaged with said brackets and projecting laterally beyond the outer sides thereof, a pair of elongated side members pivotally supported on opposite outer end portions of said front structure for swinging movement relative thereto about generally parallel vertical axes, said side members having forward portions thereof offset inwardly for engaging the outer sides of said brackets and flexing same inward as said members are swung toward same and so as to bring rear end portions of said members into side abutting engagement with the forward side frame portions of said tractor, and means for fixedly detachably securing rear end portions of said side members to said frame portions.

9. A tractor-implement combination comprising a tractor having generally parallel opposite forward side frame portions, a pair of similar vertically rigid brackets projecting forwardly from the front end of the tractor adjacent opposite sides thereof in generally parallel relation with respect to each other, said brackets being slightly flexible laterally and presenting rounded nose portions and laterally aligned top and bottom edge surfaces, a rigid implement transverse front structure having opposite end portions thereof supportingly engaged with the laterally aligned top and bottom edge surfaces of said brackets and projecting laterally beyond the outer sides thereof, a pair of elongated side members pivotally supported on opposite outer end portions of said front structure for swinging movement relative thereto about generally parallel vertical axes, said side members having forward portions thereof offset inwardly for engaging the outer sides of said brackets and flexing same inward toward each other as said members are swung toward same and so as to bring rear end portions of said members into side abutting engagement with the forward side frame portions of said tractor, means for fixedly detachably securing rear end portions of said side members to said frame portions, and a laterally outwardly extending draft bar rigidly fixed at its inner end to each of said side members, a brace means connecting an outer end portion of each draft bar with a forward portion of the adjacent side member.

10. A tractor-implement combination comprising a tractor having generally parallel opposite forward side frame portions, a pair of similar vertically rigid brackets projecting forwardly from the front end of the tractor adjacent opposite sides thereof in generally parallel relation with respect to each other, said brackets being slightly flexible laterally and presenting rounded nose portions and laterally aligned top and bottom edge surfaces, an implement front structure comprising a pair of bar elements having end portions thereof fixedly united by means retaining said bar elements in parallel relation and spaced apart a distance approximately equal to the vertical spacing of the top and bottom edge surfaces of said brackets, said front structure being supportingly mounted on said brackets with said bar elements engaging said laterally aligned top and bottom edge surfaces of the brackets and projecting laterally beyond the outer sides thereof, and a pair of elongated draft bar supporting side members pivotally supported on opposite outer end portions of said front structure for swinging movement relative thereto about generally parallel vertical axes, said side members having forward portions thereof offset inwardly for effecting cam-like engagement with the outer sides of said brackets as said members are swung inward toward the tractor so as to bring rear end portions of said members into side abutting engagement with the forward side frame portions of said tractor.

11. A tractor-implement combination comprising a tractor having generally parallel opposite forward side frame portions, a pair of similar vertically rigid brackets projecting forwardly from the front end of the tractor adjacent opposite sides thereof in generally parallel relation with respect to each other, said brackets being slightly flexible laterally and presenting rounded nose portion and laterally aligned top and bottom edge surfaces, an implement front structure comprising a pair of bar elements having end portions thereof fixedly united by means retaining said bar elements in parallel relation and spaced apart a distance approximately equal to the vertical spacing of the top and bottom edge surfaces of said brackets, said front structure being supportingly mounted on said brackets with said bar elements engaging said laterally aligned top and bottom edge surfaces of the brackets and projecting laterally beyond the outer sides thereof, a pair of elongated side members pivotally supported on opposite outer end portions of said front structure for swinging movement relative thereto about generally parallel vertical axes, said side members having forward portions thereof offset inwardly for effecting cam-like engagement with the outer sides of said brackets as said members are swung toward same and so as to bring rear end portions of said members into side abutting engagement with the forward side frame portions of said tractor, means for fixedly detachably securing rear end portions of said side members to said frame portions, and a laterally outwardly extending draft bar rigidly fixed at its inner end to each of said side members, a brace means connecting an outer end portion of each draft bar with a forward portion of the adjacent side member.

12. A drive-in type implement attachment for tractors comprising a front structure adapted for engagement with the front end of a tractor, a pair of elongated side members having their forward ends supported on said front structure for swinging movement relative thereto about generally parallel vertical axes, said side members having forward portions thereof provided with inwardly offset parts positioned for cam-like clamping engagement with tractor parts disposed therebetween as said side members are swung toward each other to bring rear portions of said side members into engagement with opposite forward side portions of a tractor, and means for detachably securing said rear portions of said side members to opposite side portions of a tractor.

13. In a drive-in type implement attachment for tractors incorporating a front structure adapted for engagement with the front end of a tractor, and incorporating a pair of elongated side members having their forward ends supported on said front structure for horizontal swinging movement relative thereto about generally vertical axes, the improvement comprising inwardly offset parts carried by forward portions of said side members in position for cam-like clamping engagement with tractor parts disposed therebetween as said side members are swung toward each other to bring rear portions thereof into engagement with opposite forward side portions of a tractor disposed therebetween.

ROBERT S. REAVES.

REFERENCES CITED

The following references are of record in the file of this patent:

UNITED STATES PATENTS

| Number | Name | Date |
|---|---|---|
| 1,906,430 | Strehlow | May 2, 1933 |
| 2,423,148 | Johnson | July 1, 1947 |